US012196380B2

(12) United States Patent
Wang et al.

(10) Patent No.: US 12,196,380 B2
(45) Date of Patent: Jan. 14, 2025

(54) PORTABLE ILLUMINATION APPARATUS

(71) Applicant: Black & Decker Inc., New Britain, CT (US)

(72) Inventors: Tao Wang, Suzhou (CN); Karen M. Baumeister, Jarrettsville, MD (US); Jonathan Kirkpatrick, Baldwin, MD (US); Xiaotian Zeng, Suzhou (CN); Ling Yang, Suzhou (CN); Timothy J. Payne, Colombus, OH (US)

(73) Assignee: Black & Decker Inc., New Britain, CT (US)

(*) Notice: Subject to any disclaimer, the term of this patent is extended or adjusted under 35 U.S.C. 154(b) by 0 days.

(21) Appl. No.: 18/313,909

(22) Filed: May 8, 2023

(65) Prior Publication Data

US 2023/0392760 A1 Dec. 7, 2023

Related U.S. Application Data

(60) Provisional application No. 63/345,281, filed on May 24, 2022.

(51) Int. Cl.

*F21L 4/04* (2006.01)
*F21L 4/02* (2006.01)
(Continued)

(52) U.S. Cl.

CPC ............... *F21L 4/045* (2013.01); *F21L 4/027* (2013.01); *F21L 4/085* (2013.01); (Continued)

(58) Field of Classification Search

CPC ..... F21L 4/045; F21L 4/04; F21L 4/08; F21L 4/005; F21V 21/0965; F21V 21/0885; F21V 21/30; F21V 21/145

See application file for complete search history.

(56) References Cited

U.S. PATENT DOCUMENTS 5,988,828 A 11/1999 Prince et al.
D474,095 S 5/2003 Luquire
(Continued)

FOREIGN PATENT DOCUMENTS

CN 201787354 U 4/2011
CN 201954278 U 8/2011
(Continued)

OTHER PUBLICATIONS

Extended European Search Report mailed Oct. 10, 2023 in corresponding EP application No. 23174503.5, 7 pages.

*Primary Examiner* — William N Harris
(74) *Attorney, Agent, or Firm* — Stephen R. Valancius

(57) ABSTRACT

A portable illumination apparatus such as, for example, a task light, that is lightweight and compact to provide enhanced illumination in an ambient environment when placed in one of a plurality of operating modes. The portable illumination apparatus includes a support base and a light module that includes one or more light sources and a rechargeable power source. The light module may be manually manipulated for movement between a collapsed, stowed position and a deployed position by rotation of about a first rotational axis. In the deployed position, the light module is rotatable about the second rotational axis that is perpendicular to the first rotational axis. The support base incorporates a carabiner clip member that facilitates secure attachment of the portable illumination apparatus to an object or surface in a manner that facilitates hands-free use of the portable illumination apparatus.

20 Claims, 9 Drawing Sheets

(51) Int. Cl.

| | |
|---|---|
| ***F21L 4/08*** | (2006.01) |
| ***F21V 21/088*** | (2006.01) |
| ***F21V 21/096*** | (2006.01) |
| ***F21V 21/14*** | (2006.01) |
| ***F21V 21/30*** | (2006.01) |
| ***F21Y 105/16*** | (2016.01) |
| ***F21Y 115/10*** | (2016.01) |

(52) U.S. Cl.

CPC ...... *F21V 21/0885* (2013.01); *F21V 21/0965* (2013.01); *F21V 21/145* (2013.01); *F21V 21/30* (2013.01); *F21Y 2105/16* (2016.08); *F21Y 2115/10* (2016.08)

(56) References Cited

U.S. PATENT DOCUMENTS

| | | | | |
|---|---|---|---|---|
| D475,591 | S | 6/2003 | Luquire | |
| 7,126,484 | B1 | 10/2006 | Luquire | |
| D565,215 | S | 3/2008 | Lee | |
| D574,692 | S | 8/2008 | Cooper | |
| D592,339 | S | 5/2009 | Crawford et al. | |
| 7,591,572 | B1 | 9/2009 | Levine | |
| 7,621,652 | B2 | 11/2009 | Zick | |
| 7,964,313 | B2 | 6/2011 | Iaconis et al. | |
| 8,025,418 | B2 | 9/2011 | Zick | |
| 8,348,483 | B2 | 1/2013 | Lin | |
| 8,888,311 | B2 | 11/2014 | Parsons | |
| 8,905,572 | B2 | 12/2014 | Mueckl et al. | |
| 8,919,988 | B2 | 12/2014 | Unger et al. | |
| D750,825 | S | 3/2016 | Bryant et al. | |
| 9,273,857 | B2 | 3/2016 | Rosenbecker et al. | |
| 9,316,366 | B2 | 4/2016 | Parsons | |
| 9,360,177 | B2 | 6/2016 | Mueckl et al. | |
| 9,541,244 | B1 | 1/2017 | Berezinski et al. | |
| 9,638,379 | B2 | 5/2017 | Sun | |
| D810,335 | S | 2/2018 | Levy et al. | |
| 9,982,851 | B2 | 5/2018 | Parsons | |
| 10,180,221 | B1 * | 1/2019 | Jeong | F21L 4/027 |
| 10,323,802 | B2 | 6/2019 | Zheng et al. | |
| 10,323,831 | B2 | 6/2019 | Harvey et al. | |
| 10,378,703 | B2 | 8/2019 | Parsons | |
| 10,400,962 | B2 | 9/2019 | Keller | |
| 10,458,641 | B2 | 10/2019 | Proeber | |
| D870,941 | S | 12/2019 | Vasquez et al. | |
| D874,043 | S | 1/2020 | Lee | |
| D875,285 | S | 2/2020 | Prieto et al. | |
| D878,648 | S | 3/2020 | Zhao | |
| 10,578,297 | B1 | 3/2020 | Zhu et al. | |
| D882,838 | S | 4/2020 | Mao | |
| D890,396 | S | 7/2020 | Bertken | |
| 10,753,585 | B2 | 8/2020 | Harvey et al. | |
| 10,859,245 | B2 | 12/2020 | Gall et al. | |
| 10,935,223 | B2 | 3/2021 | Gall et al. | |
| 10,948,171 | B2 | 3/2021 | Gall et al. | |
| 10,962,180 | B2 | 3/2021 | Cacciabeve et al. | |
| 10,984,166 | B2 | 4/2021 | Orciuoli et al. | |
| 11,019,870 | B2 | 6/2021 | Hyma | |
| 11,035,556 | B2 | 6/2021 | Proeber et al. | |
| 11,073,265 | B2 | 7/2021 | Harvey et al. | |
| 11,098,858 | B2 | 8/2021 | Westling et al. | |
| 2013/0343042 | A1 | 12/2013 | Windom | |
| 2016/0265754 | A1 * | 9/2016 | Sun | F21V 21/08 |
| 2020/0085148 | A1 | 3/2020 | Gall et al. | |
| 2020/0178363 | A1 | 6/2020 | Zhang et al. | |
| 2020/0300446 | A1 | 9/2020 | Sergyeyenko | |
| 2020/0309355 | A1 * | 10/2020 | Cacciabeve | F21V 21/088 |
| 2021/0120652 | A1 | 4/2021 | Kuta et al. | |
| 2021/0145104 | A1 | 5/2021 | Jones et al. | |
| 2021/0156528 | A1 | 5/2021 | Wenzel et al. | |
| 2021/0172574 | A1 | 6/2021 | Grandadam | |
| 2021/0172588 | A1 | 6/2021 | Kaye et al. | |
| 2021/0215327 | A1 | 7/2021 | Grandadam et al. | |

FOREIGN PATENT DOCUMENTS

| | | | |
|---|---|---|---|
| CN | 202901861 | U | 4/2013 |
| CN | 203336244 | U | 12/2013 |
| CN | 104879656 | A | 9/2015 |
| CN | 204805960 | U | 11/2015 |
| CN | 105909999 | A | 8/2016 |
| CN | 205807024 | U | 12/2016 |
| CN | 206268860 | U | 6/2017 |
| CN | 206608780 | U | 11/2017 |
| CN | 206890148 | U | 1/2018 |
| CN | 207162185 | U | 3/2018 |
| CN | 107990172 | A | 5/2018 |
| CN | 209725895 | U | 12/2019 |
| CN | 212617986 | U | 2/2021 |
| DE | 102013205416 | A1 | 10/2014 |
| EP | 3690304 | A1 | 8/2020 |
| EP | 3691231 | A1 | 8/2020 |
| WO | 20160026281 | A1 | 2/2016 |
| WO | 20200106878 | A1 | 5/2020 |
| WO | 2021101752 | A1 | 5/2021 |
| WO | 20210097056 | A1 | 5/2021 |

* cited by examiner

PORTABLE ILLUMINATION APPARATUS

CROSS-REFERENCE TO RELATED APPLICATIONS

This application claims priority to and the benefit of U.S. Provisional Application No. 63/345,281 filed on May 24, 2022, entitled PORTABLE ILLUMINATION APPARATUS, the entire contents of which are incorporated herein by reference.

TECHNICAL FIELD

One or more embodiments of the present disclosure relate generally to a portable illumination apparatus that provides illumination in an ambient environment when placed in one of a plurality of operating modes.

BACKGROUND

Portable illumination devices are used to provide selective illumination in relatively small access spaces and/or areas.

SUMMARY

A portable illumination apparatus such as, for example, a task light, that is lightweight and compact to provide enhanced illumination in an ambient environment when placed in one of a plurality of operating modes. The portable illumination apparatus includes a support base and a light module that is pivotally attached to the support base via a rotary connector member for movement between a collapsed, stowed position and a deployed position by rotation about a first rotational axis.

The support base defines a frame member having an opening at a central region thereof. The frame member has a carabiner clip member integrated therein to facilitate secure attachment of the illumination apparatus to an object or surface in a manner that facilitates hands-free use of the illumination apparatus. The frame member may also be provided with one or more anti-slip members which form anti-slip zones on the surface of the frame member which anchor or otherwise maintain the illumination apparatus on the working surface.

The rotary connector member has a bifurcated configuration that comprises an upper bracket member that is operable for connection to a lower bracket member. The upper bracket member is also operable for connection to the light module while the lower bracket member is operable for connection to the support base. The upper bracket member includes an extension member extending therefrom to define a second rotational axis that is perpendicular to the first rotational axis. In a deployed position of the light module, the upper bracket member is operable to facilitate rotation of the light module about a vertical axis (i.e., the second rotational axis).

The light module includes a light module housing that is pivotally connected to the frame member at the connection region via the rotary connector member for movement between a stowed position and a deployed position. This is accomplished by rotation of the light module housing about the first rotational axis. While maintained in the deployed position, the light module is rotatable about the second rotational axis to one of a plurality of orientations.

The light module housing defines an interior space or opening that has a light source region which supports one or more light sources operable to illuminate light, and a power source region which supports a rechargeable power source for providing power to the light sources. The light source region has a surface area that is approximately equal to a surface area of the frame member so as to engage a planar surface of the frame member in the stowed position of the light module. The power source region has a surface area that is less than the surface area of the frame member and the area of the opening so as to be recessed in the opening in the stowed position of the light module.

The frame member and the light module housing are provided with one or more magnetic elements to facilitate a magnetic attraction therebetween that creates a supplemental torque to magnetically bias the light module from the deployed position to the stowed position and also magnetically maintain the light module in the stowed position.

In the stowed position, the light module may be oriented such that a first planar surface of the light source region is directed away from the frame member. In the stowed position, the first planar surface is also coplanar with and directly engages a first planar surface of the frame member.

DRAWINGS

The various advantages of one or more exemplary embodiments will become apparent to one skilled in the art by reading the following specification and appended claims, and by referencing the following drawings, in which:

DESCRIPTION

Figure 1:
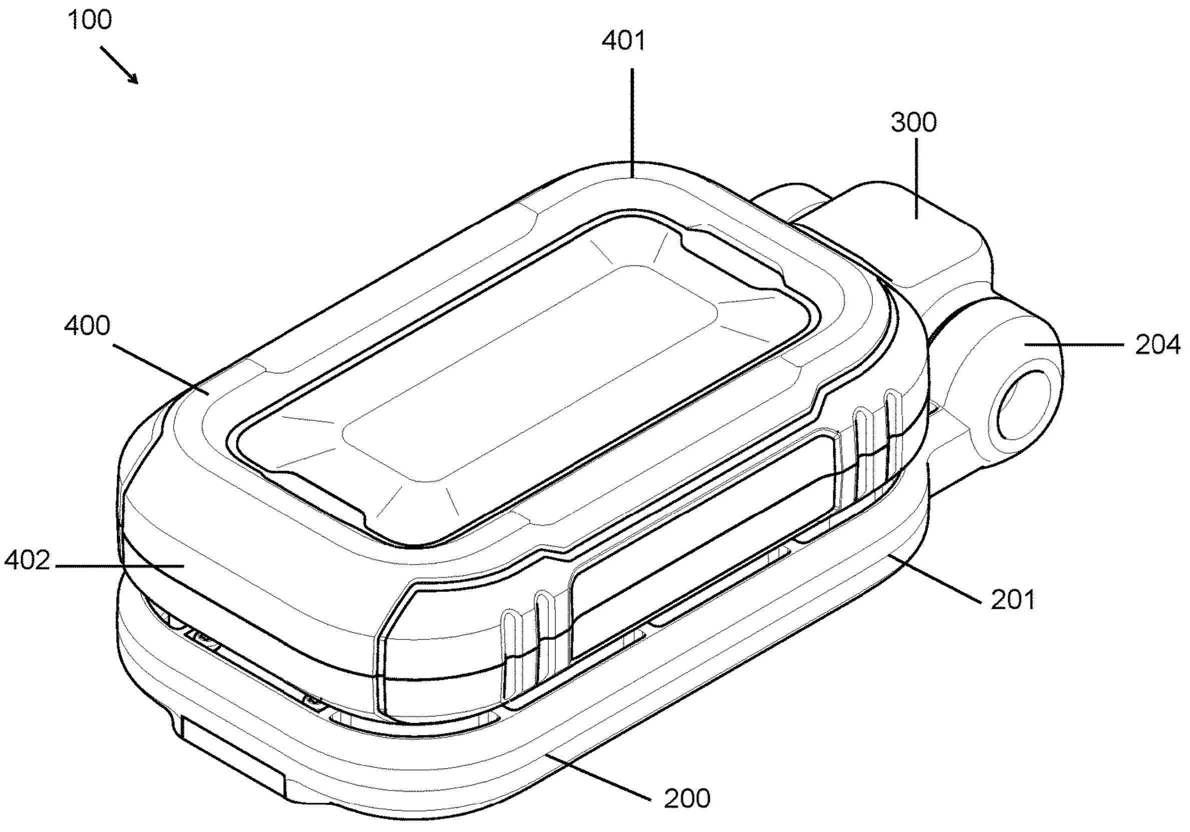
FIG. 1 illustrates a top, perspective view of an example portable illumination apparatus, in accordance with one or more embodiments set forth, shown, and described herein.

Turning to the figures, in which FIGS. 1-9 illustrates an example portable illumination apparatus 100, in accordance with one or more embodiments. The portable illumination apparatus 100 may comprise one or more operational elements. Some of the possible operational elements of the portable illumination apparatus 100 are illustrated in FIG. 1 and will now be described. It will be understood that it is not necessary for the portable illumination apparatus 100 to incorporate all the elements illustrated in the figures set forth, and/or described herein. The portable illumination apparatus 100 may have any combination of the various elements illustrated in FIG. 1. Moreover, the portable illumination apparatus 100 may have additional operational elements to those illustrated in FIG. 1.

As illustrated in FIG. 1, in accordance with one or more embodiments, the example portable illumination apparatus 100 comprises a support base 200, a rotary connector member 300, and a light module 400.

Support Base

Figure 2:
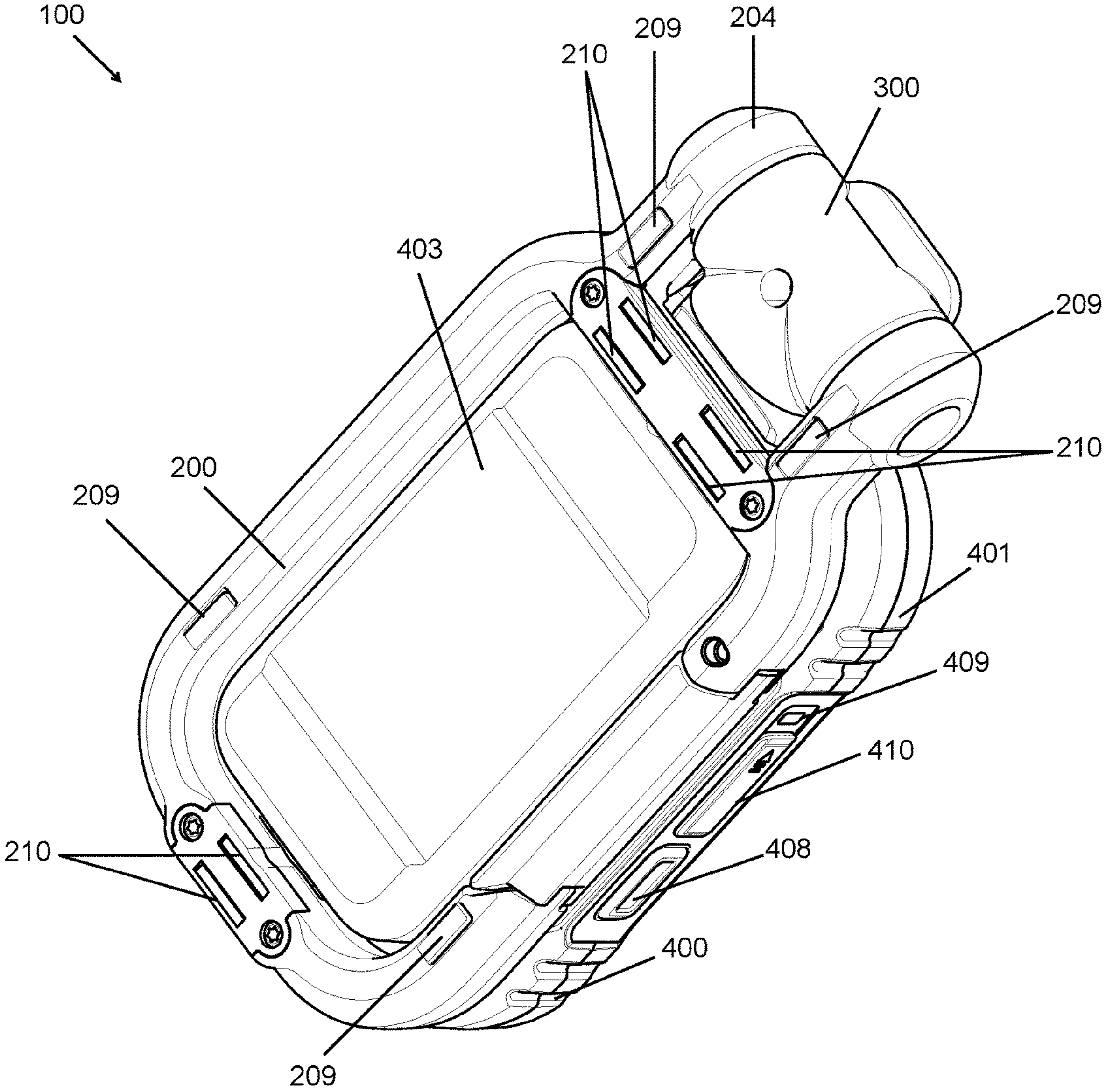
FIG. 2 illustrates a bottom, perspective view of the example portable illumination apparatus of FIG. 1.
Figure 3:
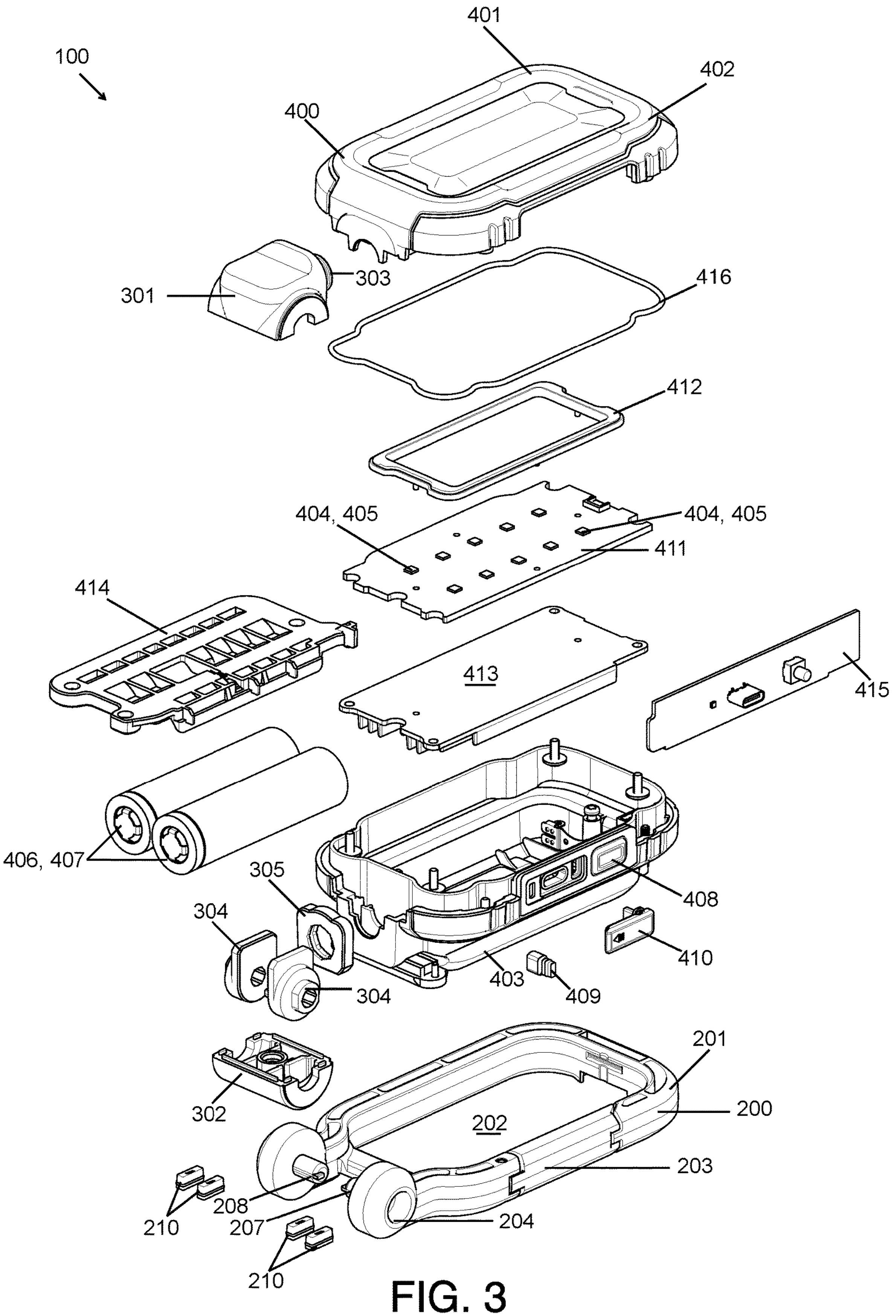
FIG. 3 illustrates an exploded view of the example portable illumination apparatus of FIG. 1.

As illustrated in FIGS. 2 and 3, the support base 200 defines a frame member 201 having an opening 202 at a central region thereof. Although the illustrated example embodiments feature the frame member 201 having a generally rectangular cross-section, embodiments are not limited thereto. This disclosure contemplates the frame member 201 having any geometric cross-section that will fall within the spirit and scope of the principles of this disclosure.

The frame member 201 also includes a carabiner clip member 203 and a connection region 204 having spaced apart pivot pin members 207, 208 defining a first rotational axis that facilitates rotation of the light module 400 about a horizontal axis. The frame member 201 is composed in whole or in part of a metallic material, a polymer material, and a composite material. Alternatively or additionally, the frame member is composed in whole or in part of a ferromagnetic material. Embodiments, however, are not limited thereto, and thus, this disclosure contemplates the frame member 201 being composed of any suitable material that falls within the spirit and scope of the principles of this disclosure.

In one or more example embodiments, the carabiner clip member 203 is integrated into the frame member 201 to facilitate secure attachment of the illumination apparatus 100 to an object or surface in a manner that facilitates hands-free use of the illumination apparatus 100. The carabiner clip member 203 is pivotably connected to the frame member 201 via a mechanical hinge pin member, and is biased into a closed position via a spring member.

One or more anti-slip members 209 are arranged on the frame member 201 to form anti-slip zones on a bottom surface of the frame member 201. The one or more anti-slip members 209 are operable to engage a working surface or support surface. The anti-slip members 209 are composed of an anti-slip material such as, for example, silicon. Embodiments, however, are not limited thereto, and thus, this disclosure contemplates the anti-slip members 209 being composed of any suitable material that falls within the spirit and scope of the principles of this disclosure. The anti-slip material has a coefficient of friction that inhibits movement of the illumination apparatus 100 on a working surface or support surface by increasing an amount of friction between the illumination apparatus 100 and the working surface or support surface. In this way, the illumination apparatus 100 is anchored or otherwise maintained on the working surface or support surface.

Rotary Connector Member

As illustrated in FIG. 3, the rotary connector member 300 has a bifurcated configuration that comprises an upper bracket member 301 that is operable for connection to a lower bracket member 302. The upper bracket member 301 is also operable for connection to the light module 400 while the lower bracket member 302 is operable for connection to the support base 200.

The upper bracket member 301 includes an extension member 303 extending therefrom to define a second rotational axis that is perpendicular to the first rotational axis, and which facilitates rotation of the light module 400 about a vertical axis in a deployed position of the light module 400. The extension member 303 includes one or more threads external threads that correspond to internal threads of a fastener member 302 to facilitate connection of the rotary connector member 300 to the light module 400. The lower bracket member 302, via rotary collar members 304, is connected to the pivot pins 207, and in turn, the frame member 201.

Light Module

The light module 400 includes a light module housing 401 having a shape or geometric cross-section that corresponds to the shape or geometric cross-section of the frame member 201. Although the illustrated example embodiments feature the light module housing 401 having a substantially rectangular cross section, embodiments are not limited thereto. This disclosure contemplates the light module housing 401 having any geometric cross-section that will fall within the spirit and scope of the principles of this disclosure.

The light module housing 401 is pivotally connected to the frame member 201 at the connection region 204 via the rotary connector member 300 for movement between a stowed position (FIGS. 1 and 2) and a deployed position (FIGS. 4-9) by rotation of the light module housing 401 about the first rotational axis. In the deployed position, the light module 400 is rotatable about the second rotational axis.

The light module housing 401 has a bifurcated configuration of two connected shell members that define an interior space or opening that has a light source region 402 and a power source region 403. The light source region 402 may be arranged at an upper section of the light module 400 and the power source region 403 may be arranged at a bottom section of the light module 400. The light source region 402 supports one or more light sources 404 operable to illuminate light. The light sources 404 comprise one or more LEDs 405 to emit illuminating light, and a reflector member 412 arranged over the LEDs 405.

As illustrated in FIG. 3, the one or more LEDs 405 are arranged in an array on a printed circuit board (PCB) 411. During activation of the light module 400, heat generated by the LEDs 405 is transmitted to the heat sink 413, which radiates the heat away from the PCB 411. The heat sink 413 is composed of a thermally conductive material, such as, for example, a metal. Embodiments, however, are not limited thereto, and thus, this disclosure contemplates the heat sink 413 being composed of any suitable material that falls within the spirit and scope of the principles of this disclosure.

In accordance with one or more example embodiments, the color temperature of light emitted by the LEDs 405 is 4,000K. Embodiments, however, are not limited thereto, and thus, this disclosure contemplates the light emitted by the LEDs 405 may have any suitable color temperature that falls within the spirit and scope of the principles of this disclosure.

A bottom planar surface of the light source region 402 has an overall surface area that is approximately equal to the overall surface area of an upper planar surface of the frame member 201 so as to directly engage the upper planar surface of the frame member 201 in the stowed position of the light module 400.

The power source region 403 supports a rechargeable power source 406 for the one or more light sources 404. The rechargeable power source 406 comprises one or more rechargeable battery cells 407 each having a capacity of at least 2 amp·hours, configured for a total capacity of at least 4.0 amp·hours. In an embodiment, other battery configurations such as pouch cells may be alternatively utilized. The planar surface of the power source region 403 has an overall surface area that is less than the overall surface area of the upper planar surface of the frame member 201 and the overall area of the opening 202 so as to be recessed in the opening 202 in the stowed position of the light module 400. A bracket member 414 is provided to maintain the one or more rechargeable batteries 407 in the light module 400.

A seal member 416 is provided between the shell members of the light module housing 401 in order to prevent moisture, debris, particles, etc. from entering into the interior space and adversely affecting the performance of the illumination apparatus 100.

The light module housing 401 is composed in whole or in part of a metallic material, a polymer material, and a composite material. Alternatively, or additionally, the light module housing 401 is composed in whole or in part of a ferromagnetic material such as, for example, aluminum. Embodiments, however, are not limited thereto, and thus, this disclosure contemplates the light module housing 401 being composed of any suitable material that falls within the spirit and scope of the principles of this disclosure.

A magnetic bias is provided to facilitate movement of the light module 400 from the deployed position to the stowed position and maintain the light module 400 in the stowed position. In accordance with one or more example embodiments, one or more magnetic elements are integrated in, arranged on, or embedded in the surface of the light module housing 401. The frame member 201 includes one or more magnetic elements 210 to facilitate a magnetic attraction between the frame member 201 and the light module housing 401 that creates a supplemental torque to magnetically bias the light module 400 from the deployed position to the stowed position and also magnetically maintain the light module 400 in the stowed position.

The light module 400 has a power charging port 408 located on an outer sidewall surface of the light module housing 401 to facilitate recharging of the rechargeable power source 406. In accordance with one or more example embodiments, the power charging port 408 comprises a USB-C port that facilitates a wired connection with a male plug of a USB-C charging cable for recharging of the rechargeable power source 406. In accordance with one or more example embodiments, the USB-C port is operable to facilitate a total charging time of 80 minutes to reach a full charged state of the rechargeable power source 406.

The light module 400 also includes a charge indicator 409 located on an outer sidewall surface of the light module housing 401 to visual indicate a charge status of the rechargeable power source 406 during a recharging sequence. The charge indicator 409 is operable to illuminate a single color that corresponds to charge status of the rechargeable power source 406. Alternatively, the charge indicator 409 is operable to illuminate a plurality of colors that correspond to charge status of the rechargeable power source 406.

The light module 400 further also includes a control switch member 410 located on an outer sidewall surface of the light module housing 401 to control activation/deactivation of the light sources 404 between a plurality of operating modes. The one or more LEDs 405 are operable for manual control by a user via the control switch member 410 emit illuminating light. In particular, the control switch member 410 is also operable to control an output/intensity of light emitted by the light sources 404 between the plurality of operating modes. In a first or maximum operating mode, the light sources 404 have an output of 1000 lumens (L) and a runtime of 4 hours. In a second or intermediate operating mode, the light sources 404 have an output of 500 lm and a runtime of 8 hours. In a third or minimum operating mode, the light sources 404 have an output of 500 lm and a runtime of 12 hours. A PCB 415 is provided for the power charge port 408, the charge indicator 409, and the power control switch 410.

The light module housing 401 may be oriented, in the stowed position, such that an upper planar surface of the light source region 402 is directed away from the frame member 201. In the stowed position of the light module 400, the lower planar surface of the light source region 402 is also coplanar with and directly engages the upper planar surface of the frame member 201.

Figure 4:
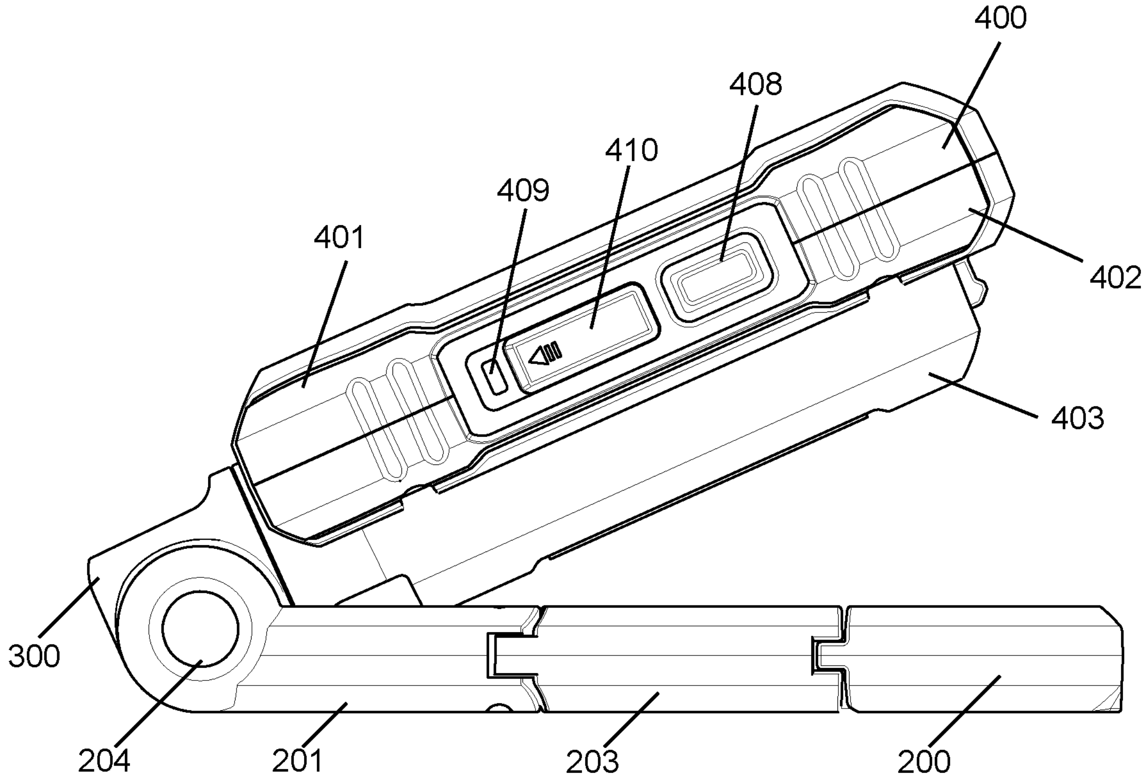
FIG. 4 illustrates a side view of the example portable illumination apparatus of FIG. 1 in a first orientation.

In the illustrated example of FIG. 4, the light module 400 is in a deployed state in which it is rotated approximately 45° about the first rotational axis. In this orientation of the light module 400, the power source region 403 is moved out of the opening 202 and the light source region 402 is oriented to emit illuminating light in a direction away from the frame member 201.

Figure 5:
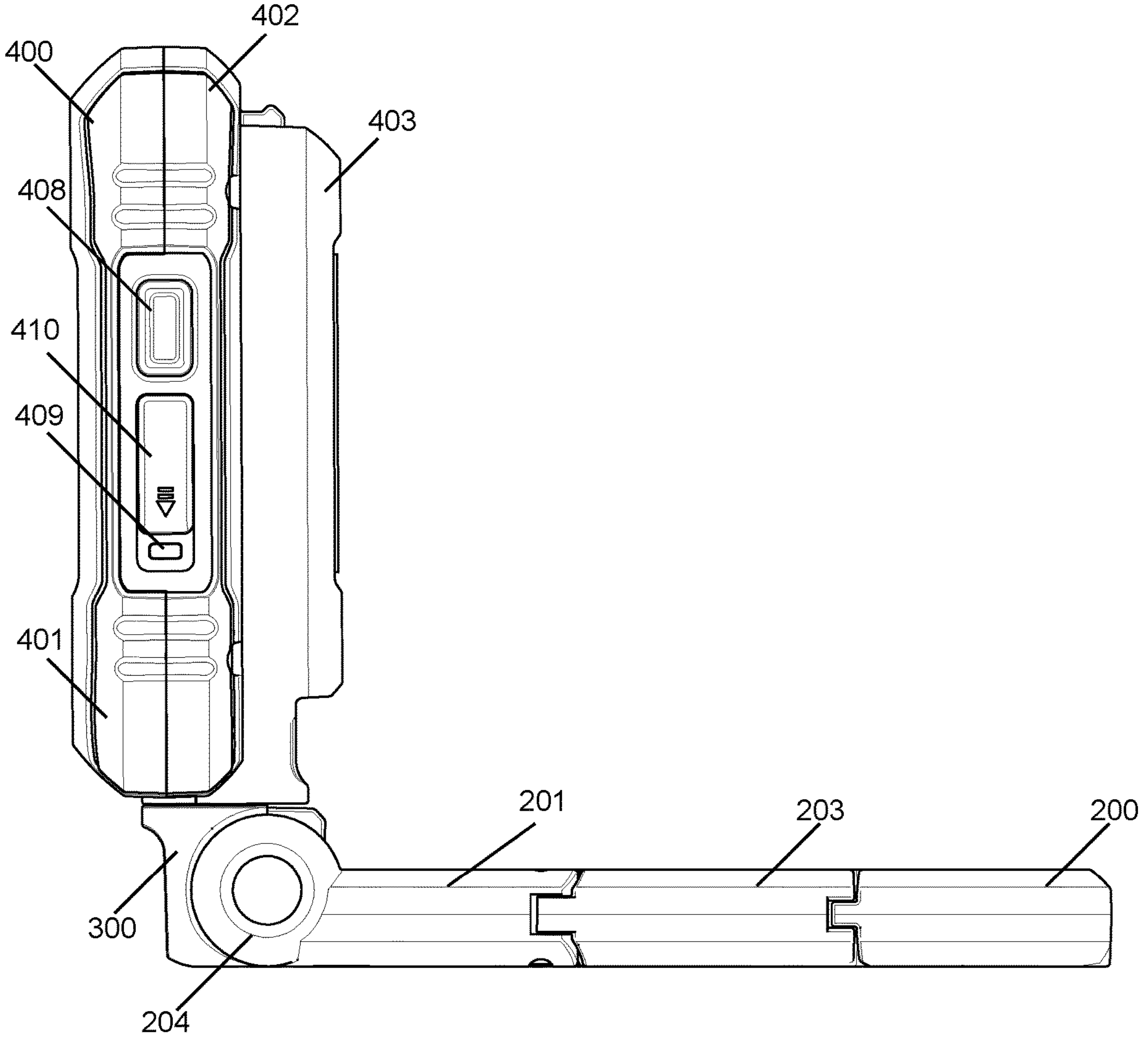
FIG. 5 illustrates a side view of the example portable illumination apparatus of FIG. 1 in a second deployed orientation.

In the illustrated example of FIG. 5, the light module 400 is in a deployed state in which it is rotated approximately 90° about the first rotational axis A1. In this orientation of the light module 400, the power source region 403 is moved out of the opening 202 and the light source region 402 is oriented to emit illuminating light in a direction away from the frame member 201.

Figure 6:
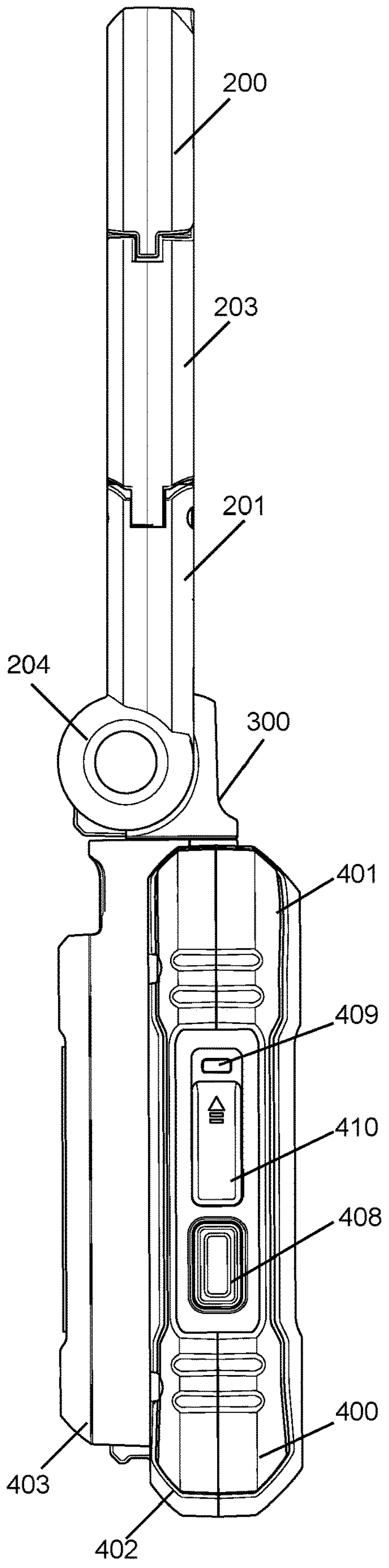
FIG. 6 illustrates a side view of the example portable illumination apparatus of FIG. 1 in a third deployed orientation.

In the illustrated example of FIG. 6, the light module 400 is in a deployed state in which it is rotated approximately 180° about the first rotational axis A1. In this orientation of the light module 400, the power source region 403 is moved out of the opening 202 and the light source region 402 is oriented to emit illuminating light in a direction away from the frame member 201.

Figure 7:
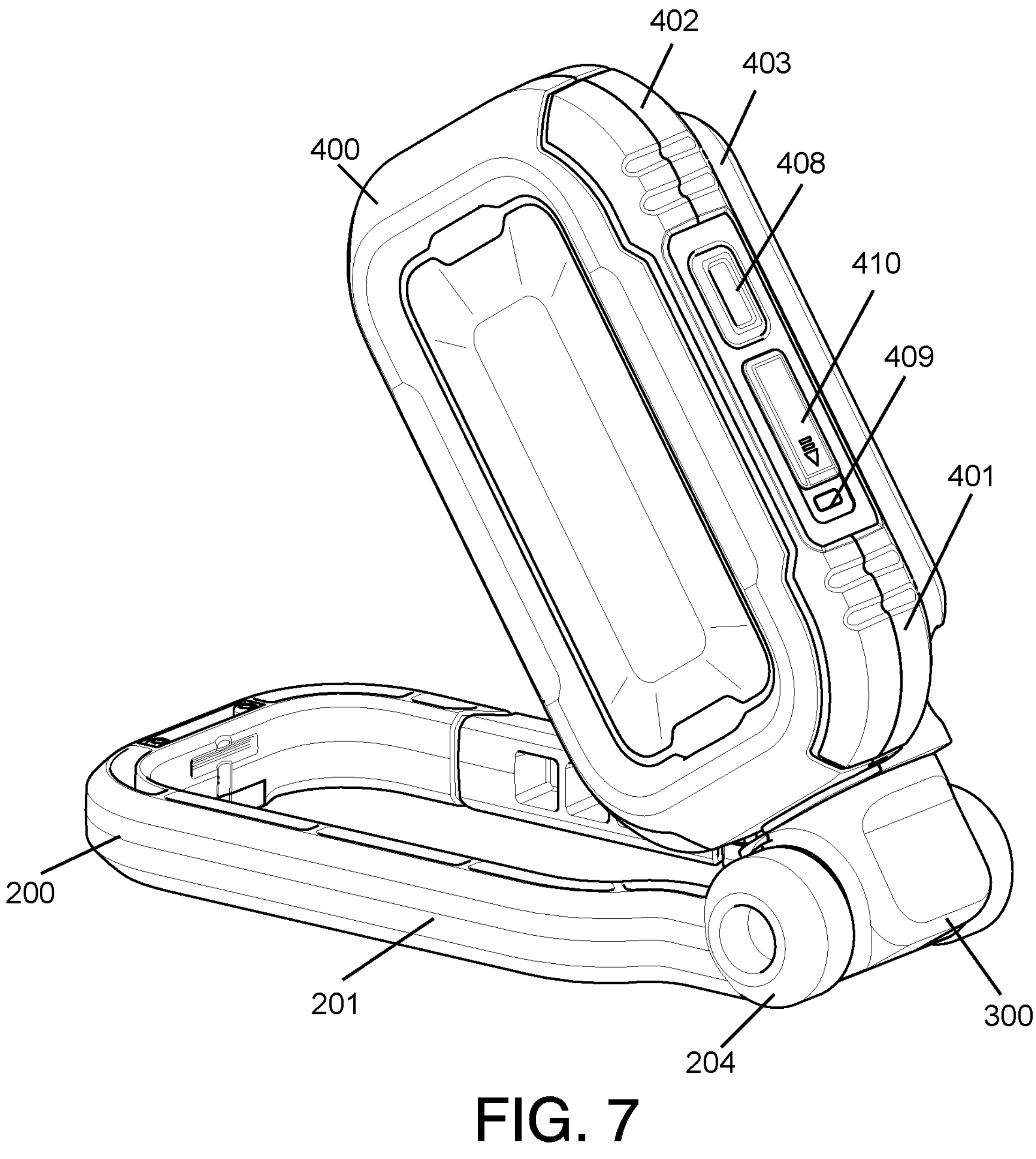
FIG. 7 illustrates a side view of the example portable illumination apparatus of FIG. 1 in a fourth deployed orientation.
Figure 8:
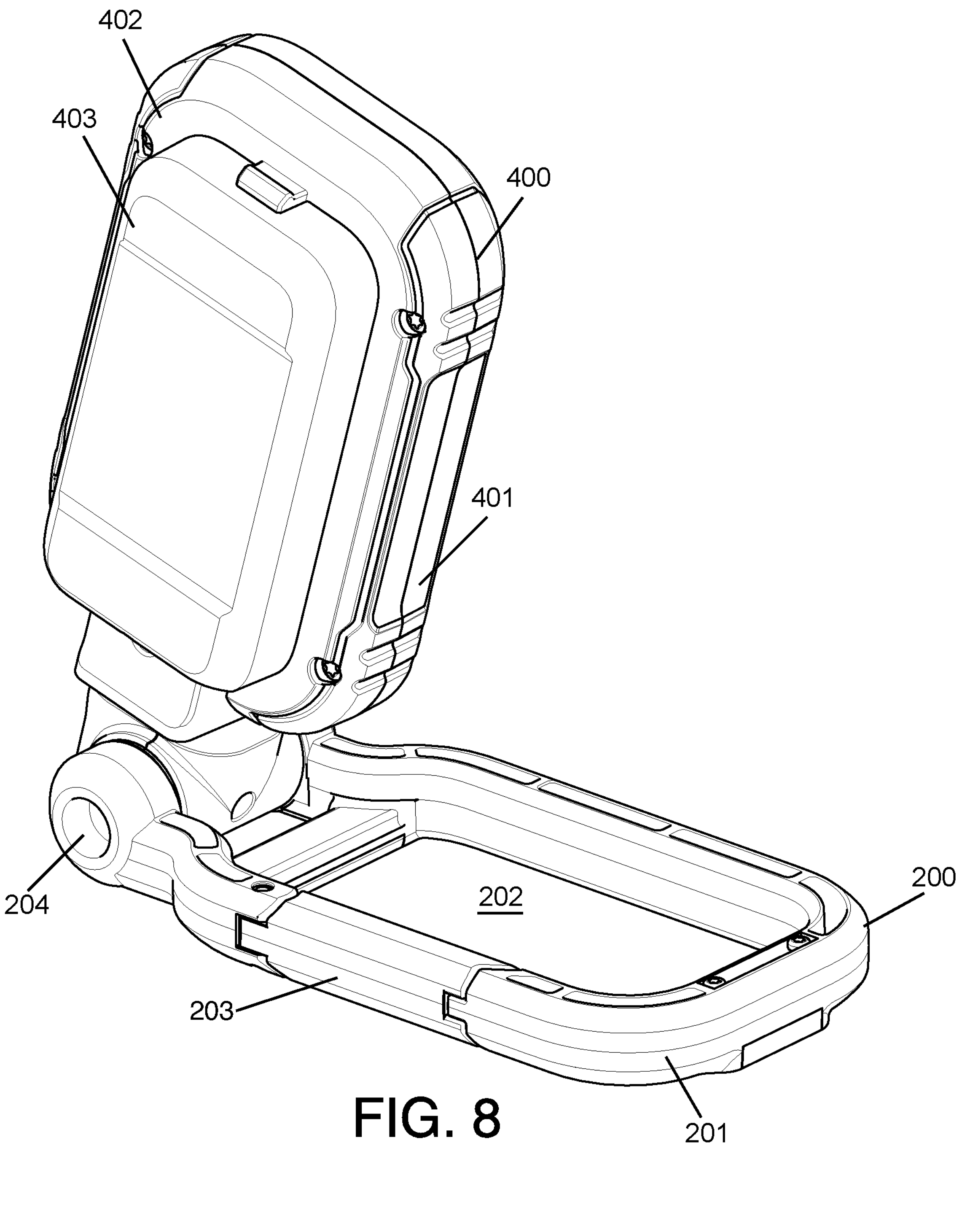
FIG. 8 illustrates a side view of the example portable illumination apparatus of FIG. 1 in a fifth deployed orientation.

In the illustrated example of FIGS. 7 and 8, the light module 400 is in a deployed state in which it is rotated approximately 45° about the first rotational axis and also rotated approximately 90° about the second rotational axis. In this orientation of the light module 400, the power source region 403 is moved out of the opening 202 and the light source region 402 is oriented to emit illuminating light in a direction away from the frame member 201.

Figure 9:
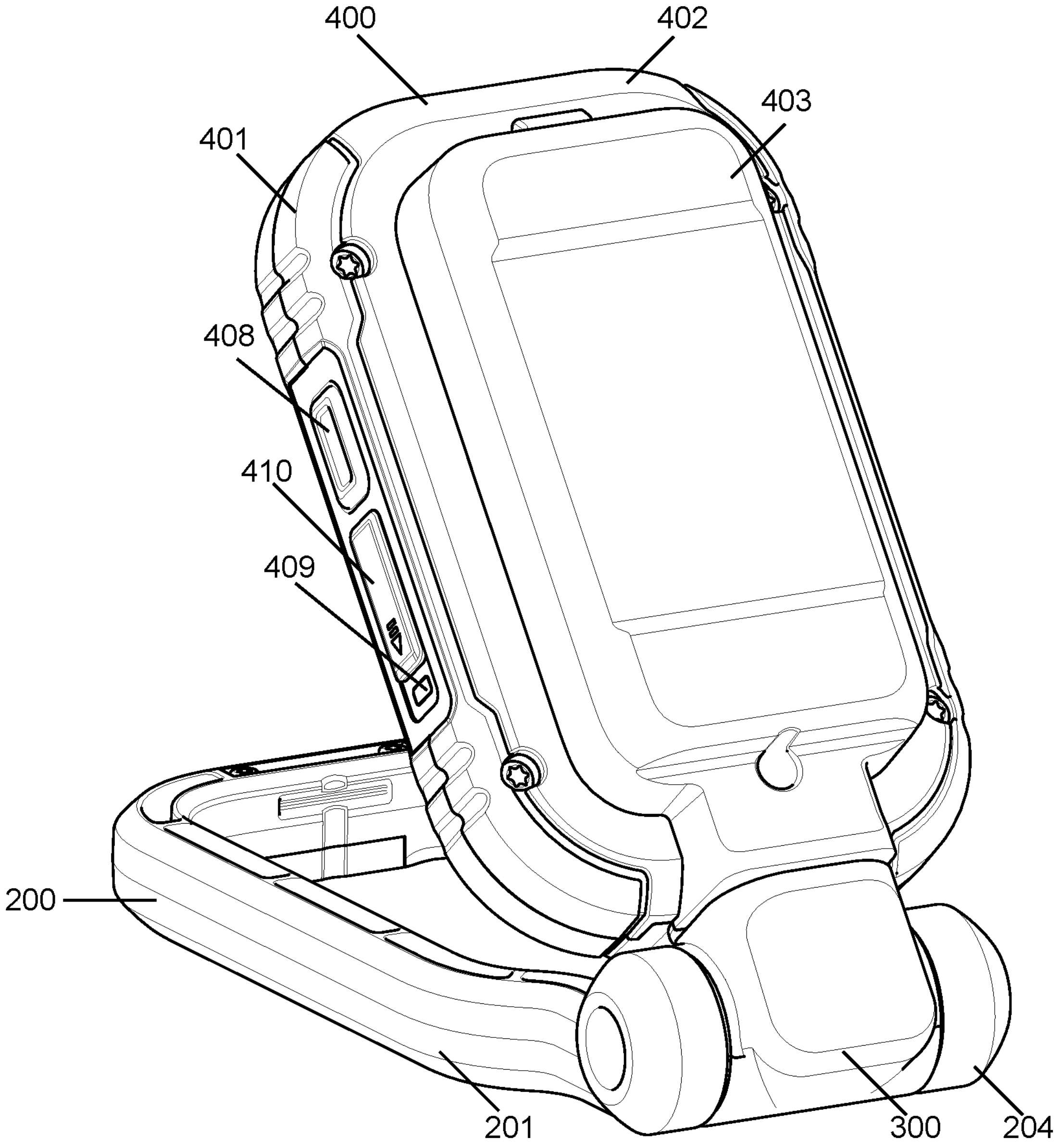
FIG. 9 illustrates a side view of the example portable illumination apparatus of FIG. 1 in a sixth deployed orientation.

In the illustrated example of FIG. 9, the light module 400 is in a deployed state in which it is rotated approximately 45° about the first rotational axis and also rotated approximately 180° about the second rotational axis. In this orientation of the light module 400, the power source region 403 is moved out of the opening 202 and the light source region 402 is oriented to emit illuminating light in a direction towards the frame member 201.

ADDITIONAL NOTES AND EXAMPLES

Example 1 may include an illumination apparatus, comprising: a support base defining a frame member having an opening at a center thereof, a carabiner clip member, and a connection region defining a first rotational axis; a rotary connector member defining a second rotational axis that is perpendicular to the first rotational axis; and a light module mountable to the connection region via the rotary connector member for movement between a stowed position and a deployed position by rotation of the light module about the first rotational axis. The light module includes: a light module housing having a light source region that supports one or more light sources operable to illuminate light, the light source region having a surface area that is approximately equal to a surface area of the frame member so as to engage a planar surface of the frame member in the stowed position of the light module, and a power source region that supports a rechargeable power source, power source region having a surface area that is less than the surface area of the frame member so as to be recessed in the opening in the stowed position of the light module.

Example 2 may include the illumination apparatus of Example 1, wherein in the stowed position, the light module is oriented such that a first planar surface of the light source region is directed away from the frame member.

Example 3 may include the illumination apparatus of Example 1, wherein in the stowed position, the light module is oriented such that a first planar surface of the light source region is coplanar with a first planar surface of the frame member.

Example 4 may include the illumination apparatus of Example 1, wherein in the stowed position, the light module is oriented such that a planar surface of the light source region engages a first planar surface of the frame member.

Example 5 may include the illumination apparatus of Example 1, wherein in the deployed position, the light module is rotatable about the second rotational axis.

Example 6 may include the illumination apparatus of Example 1, wherein the frame member is composed in whole or in part of a metallic material, a polymer material, and a composite material.

Example 7 may include the illumination apparatus of Example 1, wherein the frame member is composed in whole or in part of a ferromagnetic material.

Example 8 may include the illumination apparatus of Example 1, further comprising a magnetic bias to facilitate movement of the light module from the deployed position to the stowed position and maintain the light module in the stowed position.

Example 9 may include the illumination apparatus of Example 8, further comprising one or more first magnetic elements arranged on or embedded in the surface of the light module.

Example 100 may include the illumination apparatus of Example 9, wherein the frame member comprises a second magnetic element to facilitate a magnetic attraction between the frame member and the light module that creates a supplemental torque that magnetically biases the light module from the deployed position to the stowed position and also magnetically maintains the light module in the stowed position.

Example 11 may include the illumination apparatus of Example 1, wherein the frame member comprises a pair of spaced apart frame leg members connected by a pair of frame cross members.

Example 12 may include the illumination apparatus of Example 11, wherein the carabiner clip member is integrated into one of the frame leg members.

Example 13 may include the illumination apparatus of Example 12, wherein the carabiner clip member is pivotably connected to the frame leg member via a hinge pin member.

Example 14 may include the illumination apparatus of Example 13, wherein the carabiner clip member is biased into a closed position via a spring member.

Example 15 may include the illumination apparatus of Example 11, wherein each frame leg member terminates to a pivot pin at the connection region.

Example 16 may include the illumination apparatus of Example 15, wherein the rotary member is connected at a first longitudinal end to the light module and at a second longitudinal end to the frame member.

Example 17 may include the illumination apparatus of Example 1, wherein the light module is composed in whole or in part of a metallic material, a polymer material, and a composite material.

Example 18 may include the illumination apparatus of Example 1, wherein the light module is composed in whole or in part of a ferromagnetic material.

Example 19 may include the illumination apparatus of Example 1, wherein the light module comprises a power charging port located on an outer sidewall surface thereof to facilitate recharging of the rechargeable power source.

Example 20 may include the illumination apparatus of Example 19, wherein the power charging port comprises a USB-C port.

Example 21 may include the illumination apparatus of Example 20, wherein the USB-C port facilitates a wired connection with a male plug of a USB-C charging cable for recharging of the rechargeable power source.

Example 22 may include the illumination apparatus of Example 20, wherein the USB-C port facilitates a total charging time of 80 minutes to reach a full charged state of the rechargeable power source.

Example 23 may include the illumination apparatus of Example 1, wherein the light module comprises a charge indicator located on an outer sidewall surface thereof to visual indicate a charge status of the rechargeable power source during a recharging sequence of the rechargeable power source.

Example 24 may include the illumination apparatus of Example 23, wherein the charge indicator is operable to illuminate a single color that corresponds to charge status of the rechargeable power source.

Example 25 may include the illumination apparatus of Example 1, wherein the light sources comprise one or more LEDs.

Example 26 may include the illumination apparatus of Example 25, wherein a color temperature of light emitted by the LEDs is 4,000K.

Example 27 may include the illumination apparatus of Example 25, wherein the light module comprises a control switch member located on an outer sidewall surface thereof which is operable to control activation/deactivation of the LEDs.

Example 28 may include the illumination apparatus of Example 27, wherein the control switch member is operable to control an output/intensity of light emitted by the LEDs between a plurality of operating modes.

Example 29 may include the illumination apparatus of Example 28, wherein in a first/maximum operating mode, the light sources have an output of 1000 lm and a runtime of 4 hours.

Example 30 may include the illumination apparatus of Example 28, wherein in a second/intermediate operating mode, the light sources have an output of 500 lm and a runtime of 8 hours.

Example 31 may include the illumination apparatus of Example 28, wherein in a third/minimum operating mode, the light sources have an output of 500 lm and a runtime of 12 hours.

Example 32 may include the illumination apparatus of Example 1, wherein the rechargeable power source region 404 comprises a rechargeable battery power source.

Example 33 may include the illumination apparatus of Example 32, wherein the rechargeable battery source comprises one or more rechargeable batteries.

Example 34 may include the illumination apparatus of Example 1, further comprising one or more anti-slip members on the frame member to facilitate anti-slip zones on the surface of the frame member.

Example 35 may include the illumination apparatus of Example 34, wherein the one or more anti-slip members are composed of an anti-slip material having a coefficient of friction that inhibits movement of the illumination apparatus on a working surface.

Example 36 may include the illumination apparatus of Example 35, wherein the anti-slip material comprises silicon.

Example 1B may include an illumination apparatus, comprising: a support base defining a frame member having an opening at a center thereof and a connection region defining a first rotational axis; a rotary member defining a second rotational axis that is perpendicular to the first rotational axis; and a light module mountable on the connection region via the rotary member for movement between a stowed position and a deployed position by rotation of the light module about the first rotational axis, the light module including a light module housing having a light source region operable to illuminate light, and a power source region operable to supply power to the light source region, the power source region having a surface area that is less than a surface area of the frame base member so as to be recessed in the opening of the frame member in the stowed position of the light module.

Example 2B may include the illumination apparatus of Example 1 B, wherein in the stowed position, the light module is oriented such that a first planar surface of the light source region is directed away from the frame member.

Example 3B may include the illumination apparatus of Example 1 B, wherein in the stowed position, the light module is oriented such that a first planar surface of the light source region is coplanar with a first planar surface of the frame member.

Example 4B may include the illumination apparatus of Example 1 B, wherein in the stowed position, the light module is oriented such that a planar surface of the light source region engages a first planar surface of the frame member.

Example 5B may include the illumination apparatus of Example 1 B, wherein in the deployed position, the light module is rotatable about the second rotational axis.

Example 6B may include the illumination apparatus of Example 1 B, wherein the frame member is composed in whole or in part of a metallic material, a polymer material, and a composite material.

Example 7B may include the illumination apparatus of Example 1 B, wherein the frame member is composed in whole or in part of a ferromagnetic material.

Example 8B may include the illumination apparatus of Example 1 B, further comprising a magnetic bias to facilitate movement of the light module from the deployed position to the stowed position and maintain the light module in the stowed position.

Example 9B may include the illumination apparatus of Example 8B, further comprising one or more first magnetic elements arranged on or embedded in the surface of the light module.

Example 10B may include the illumination apparatus of Example 9B, wherein the frame member comprises a second magnetic element to facilitate a magnetic attraction between the frame member and the light module that creates a supplemental torque that magnetically biases the light module from the deployed position to the stowed position and also magnetically maintains the light module in the stowed position.

Example 11B may include the illumination apparatus of Example 1 B, wherein the frame member comprises a pair of spaced apart frame leg members connected by a pair of frame cross members.

Example 12B may include the illumination apparatus of Example 11B, wherein the carabiner clip member is integrated into one of the frame leg members.

Example 13B may include the illumination apparatus of Example 12B, wherein the carabiner clip member is pivotably connected to the frame leg member via a hinge pin member.

Example 14B may include the illumination apparatus of Example 13B, wherein the carabiner clip member is biased into a closed position via a spring member.

Example 15B may include the illumination apparatus of Example 11B, wherein each frame leg member terminates to a pivot pin at the connection region.

Example 16B may include the illumination apparatus of Example wherein the rotary member is connected at a first longitudinal end to the light module and at a second longitudinal end to the frame member.

Example 17B may include the illumination apparatus of Example 1 B, wherein the light module is composed in whole or in part of a metallic material, a polymer material, and a composite material.

Example 18B may include the illumination apparatus of Example 1 B, wherein the light module is composed in whole or in part of a ferromagnetic material.

Example 19B may include the illumination apparatus of Example 1 B, wherein the light module comprises a power charging port located on an outer sidewall surface thereof to facilitate recharging of the rechargeable power source.

Example 20B may include the illumination apparatus of Example 19B, wherein the power charging port comprises a USB-C port.

Example 21B may include the illumination apparatus of Example wherein the USB-C port facilitates a wired connection with a male plug of a USB-C charging cable for recharging of the rechargeable power source.

Example 22B may include the illumination apparatus of Example wherein the USB-C port facilitates a total charging time of 80 minutes to reach a full charged state of the rechargeable power source.

Example 23B may include the illumination apparatus of Example 1 B, wherein the light module comprises a charge indicator located on an outer sidewall surface thereof to visual indicate a charge status of the rechargeable power source during a recharging sequence of the rechargeable power source.

Example 24B may include the illumination apparatus of Example 23B, wherein the charge indicator is operable to illuminate a single color that corresponds to charge status of the rechargeable power source.

Example 25B may include the illumination apparatus of Example 1 B, wherein the light sources comprise one or more LEDs.

Example 26B may include the illumination apparatus of Example wherein a color temperature of light emitted by the LEDs is 4,000K.

Example 27B may include the illumination apparatus of Example wherein the light module comprises a control switch member located on an outer sidewall surface thereof which is operable to control activation/deactivation of the LEDs.

Example 28B may include the illumination apparatus of Example 27B, wherein the control switch member is operable to control an output/intensity of light emitted by the LEDs between a plurality of operating modes.

Example 29B may include the illumination apparatus of Example 28B, wherein in a first/maximum operating mode, the light sources have an output of 1000 lm and a runtime of 4 hours.

Example 30B may include the illumination apparatus of Example 28B, wherein in a second/intermediate operating mode, the light sources have an output of 500 lm and a runtime of 8 hours.

Example 31B may include the illumination apparatus of Example 28B, wherein in a third/minimum operating mode, the light sources have an output of 500 lm and a runtime of 12 hours.

Example 32B may include the illumination apparatus of Example 1 B, wherein the rechargeable power source region 404 comprises a rechargeable battery power source.

Example 33B may include the illumination apparatus of Example 32B, wherein the rechargeable battery source comprises one or more rechargeable batteries.

Example 34B may include the illumination apparatus of Example 1 B, further comprising one or more anti-slip members on the frame member to facilitate anti-slip zones on the surface of the frame member.

Example 35B may include the illumination apparatus of Example 34B, wherein the one or more anti-slip members are composed of an anti-slip material having a coefficient of friction that inhibits movement of the illumination apparatus on a working surface.

Example 36B may include the illumination apparatus of Example 35B, wherein the anti-slip material comprises silicon.

Example 1C may include an illumination apparatus, comprising: a support base defining a frame member having a connection region defining a first rotational axis; a rotary member, attached to the frame member at the connection region, and defining a second rotational axis that is perpendicular to the first rotational axis; and a light module having one or more light sources operable to illuminate light, the light module being mountable on the connection region via the rotary member for movement between a stowed position and a deployed position by rotation of the light module about the first rotational axis, wherein the light module is rotatable about the second rotational axis when placed in the deployed position.

Example 2C may include the illumination apparatus of Example 1C, wherein in the stowed position, the light module is oriented such that a first planar surface of the light source region is directed away from the frame member.

Example 3C may include the illumination apparatus of Example 1C, wherein in the stowed position, the light module is oriented such that a first planar surface of the light source region is coplanar with a first planar surface of the frame member.

Example 4C may include the illumination apparatus of Example 1C, wherein in the stowed position, the light module is oriented such that a planar surface of the light source region engages a first planar surface of the frame member.

Example 5C may include the illumination apparatus of Example 1C, wherein in the deployed position, the light module is rotatable about the second rotational axis.

Example 6C may include the illumination apparatus of Example 1C, wherein the frame member is composed in whole or in part of a metallic material, a polymer material, and a composite material.

Example 7C may include the illumination apparatus of Example 1C, wherein the frame member is composed in whole or in part of a ferromagnetic material.

Example 8C may include the illumination apparatus of Example 1C, further comprising a magnetic bias to facilitate movement of the light module from the deployed position to the stowed position and maintain the light module in the stowed position.

Example 9C may include the illumination apparatus of Example 8C, further comprising one or more first magnetic elements arranged on or embedded in the surface of the light module.

Example 10C may include the illumination apparatus of Example 9C, wherein the frame member comprises a second magnetic element to facilitate a magnetic attraction between the frame member and the light module that creates a supplemental torque that magnetically biases the light module from the deployed position to the stowed position and also magnetically maintains the light module in the stowed position.

Example 11C may include the illumination apparatus of Example 1C, wherein the frame member comprises a pair of spaced apart frame leg members connected by a pair of frame cross members.

Example 12C may include the illumination apparatus of Example 11C, wherein the carabiner clip member is integrated into one of the frame leg members.

Example 13C may include the illumination apparatus of Example 12C, wherein the carabiner clip member is pivotably connected to the frame leg member via a hinge pin member.

Example 14C may include the illumination apparatus of Example 13C, wherein the carabiner clip member is biased into a closed position via a spring member.

Example 15C may include the illumination apparatus of Example 11C, wherein each frame leg member terminates to a pivot pin at the connection region.

Example 16C may include the illumination apparatus of Example wherein the rotary member is connected at a first longitudinal end to the light module and at a second longitudinal end to the frame member.

Example 17C may include the illumination apparatus of Example 1C, wherein the light module is composed in whole or in part of a metallic material, a polymer material, and a composite material.

Example 18C may include the illumination apparatus of Example 1C, wherein the light module is composed in whole or in part of a ferromagnetic material.

Example 19C may include the illumination apparatus of Example 1C, wherein the light module comprises a power charging port located on an outer sidewall surface thereof to facilitate recharging of the rechargeable power source.

Example 20C may include the illumination apparatus of Example 19C, wherein the power charging port comprises a USB-C port.

Example 21C may include the illumination apparatus of Example wherein the USB-C port facilitates a wired connection with a male plug of a USB-C charging cable for recharging of the rechargeable power source.

Example 22C may include the illumination apparatus of Example wherein the USB-C port facilitates a total charging time of 80 minutes to reach a full charged state of the rechargeable power source.

Example 23C may include the illumination apparatus of Example 1C, wherein the light module comprises a charge indicator located on an outer sidewall surface thereof to visual indicate a charge status of the rechargeable power source during a recharging sequence of the rechargeable power source.

Example 24C may include the illumination apparatus of Example 23C, wherein the charge indicator is operable to illuminate a single color that corresponds to charge status of the rechargeable power source.

Example 25C may include the illumination apparatus of Example 1C, wherein the light sources comprise one or more LEDs.

Example 26C may include the illumination apparatus of Example wherein a color temperature of light emitted by the LEDs is 4,000K.

Example 27C may include the illumination apparatus of Example wherein the light module comprises a control switch member located on an outer sidewall surface thereof which is operable to control activation/deactivation of the LEDs.

Example 28C may include the illumination apparatus of Example 27C, wherein the control switch member is operable to control an output/intensity of light emitted by the LEDs between a plurality of operating modes.

Example 29C may include the illumination apparatus of Example 28C, wherein in a first/maximum operating mode, the light sources have an output of 1000 lm and a runtime of 4 hours.

Example 30C may include the illumination apparatus of Example 28C, wherein in a second/intermediate operating mode, the light sources have an output of 500 lm and a runtime of 8 hours.

Example 31C may include the illumination apparatus of Example 28C, wherein in a third/minimum operating mode, the light sources have an output of 500 lm and a runtime of 12 hours.

Example 32C may include the illumination apparatus of Example 1C, wherein the rechargeable power source region 404 comprises a rechargeable battery power source.

Example 33C may include the illumination apparatus of Example 32C, wherein the rechargeable battery source comprises one or more rechargeable batteries.

Example 34C may include the illumination apparatus of Example 1C, further comprising one or more anti-slip members on the frame member to facilitate anti-slip zones on the surface of the frame member.

Example 35C may include the illumination apparatus of Example 34C, wherein the one or more anti-slip members are composed of an anti-slip material having a coefficient of friction that inhibits movement of the illumination apparatus on a working surface.

Example 36C may include the illumination apparatus of Example wherein the anti-slip material comprises silicon.

CHART

| ITEM | PERFORMANCE CHARACTERISTICS |
|---|---|
| Power source | 18650 Cells 4 V 4.0 Ah (2*2.0 Ah) |
| Brightness | High: 1000 lm(Min High -700 lm)<br>Medium: 500 lm (Min Med -350 lm)<br>Low: 250 lm (Min Low-150 lm) |
| Runtime | High: 4 hours (Min High-2 hrs)<br>Medium: 8 hours (Min Med-4.5 hrs)<br>Low: 12 hours |
| Charge time | 80 min = 100% (Min. -100min) |
| Weight | <0.75 lbs |

What is claimed is:

1. An illumination apparatus, comprising:

a support base defining a frame member having an opening at a center thereof, a carabiner clip member, and a connection region defining a first rotational axis;

a rotary connector member defining a second rotational axis that is perpendicular to the first rotational axis; and a light module mountable to the connection region via the rotary connector member for movement between a stowed position and a deployed position by rotation of the light module about the first rotational axis;

wherein the light module comprises a light module housing having a light source region that supports one or more light sources operable to illuminate light, the light source region having a surface area that is approximately equal to a surface area of the frame member so as to engage a planar surface of the frame member in the stowed position of the light module, and a power source region that supports a rechargeable power source, the power source region having a surface area that is less than the surface area of the frame member so as to be recessed in the opening in the stowed position of the light module; and wherein the opening is a through hole opening.

2. The illumination apparatus of claim 1, wherein in the stowed position, the light module is oriented such that a first planar surface of the light source region is directed away from the frame member.

3. The illumination apparatus of claim 1, wherein in the stowed position, the light module is oriented such that a first planar surface of the light source region is coplanar with the planar surface of the frame member.

4. The illumination apparatus of claim 1, wherein in the stowed position, the light module is oriented such that a planar surface of the light source region engages the planar surface of the frame member.

5. The illumination apparatus of claim 1, wherein in the deployed position, the light module is rotatable about the second rotational axis.

6. The illumination apparatus of claim 1, wherein the frame member is composed in whole or in part of a ferromagnetic material.

7. The illumination apparatus of claim 1, wherein the light module comprises a power charging port located on an outer sidewall surface thereof to facilitate recharging of the rechargeable power source; and wherein the power charging port facilitates a total charging time of 80 minutes to reach a full charged state of the rechargeable power source.

8. The illumination apparatus of claim 1, further comprising one or more anti-slip members on the frame member to facilitate anti-slip zones on a surface of the frame member.

9. An illumination apparatus, comprising:

a support base defining a frame member having an opening at a center thereof and a connection region defining a first rotational axis;

a rotary member defining a second rotational axis that is perpendicular to the first rotational axis; and a light module mountable on the connection region via the rotary member for movement between a stowed position and a deployed position by rotation of the light module about the first rotational axis, the light module including a light module housing having a light source region operable to illuminate light, and a power source region operable to supply power to the light source region, the power source region having a surface area that is less than a surface area of the frame member so as to be recessed in the opening of the frame member in the stowed position of the light module;

wherein the opening is a through hole opening.

10. The illumination apparatus of claim 9, wherein in the stowed position, the light module is oriented such that a first planar surface of the light source region is directed away from the frame member.

11. The illumination apparatus of claim 9, wherein in the stowed position, the light module is oriented such that a first planar surface of the light source region is coplanar with a first planar surface of the frame member.

12. The illumination apparatus of claim 9, wherein in the deployed position, the light module is rotatable about the second rotational axis.

13. The illumination apparatus of claim 9, wherein the frame member is composed in whole or in part of a ferromagnetic material.

14. The illumination apparatus of claim 9, wherein the frame member comprises a pair of spaced apart frame leg members connected by a pair of frame cross members;

wherein each frame leg member terminates to a pivot pin at the connection region; and wherein the rotary member is connected at a first longitudinal end to the light module and at a second longitudinal end to the frame member.

15. The illumination apparatus of claim 9, wherein the light module is composed in whole or in part of a metallic material, a polymer material, or a composite material.

16. The illumination apparatus of claim 9, wherein the light module is composed in whole or in part of a ferromagnetic material.

17. An illumination apparatus, comprising:

a support base defining a frame member having a connection region defining a first rotational axis;

a rotary member, attached to the frame member at the connection region, and defining a second rotational axis that is perpendicular to the first rotational axis; and a light module having one or more light sources operable to illuminate light, the light module being mountable on the connection region via the rotary member for movement between a stowed position and a deployed position by rotation of the light module about the first rotational axis, wherein the light module is rotatable about the second rotational axis when placed in the deployed position, wherein the frame member has an opening at a center thereof; and wherein the opening is a through hole opening.

18. The illumination apparatus of claim 17, wherein in the stowed position, the light module is oriented such that a first planar surface of a light source region that supports the one or more light sources is directed away from the frame member.

19. The illumination apparatus of claim 17, wherein in the stowed position, the light module is oriented such that a first planar surface of a light source region that supports the one or more light sources is coplanar with a first planar surface of the frame member.

20. The illumination apparatus of claim 17, wherein in the stowed position, the light module is oriented such that a planar surface of a light source region that supports the one or more light sources engages a first planar surface of the frame member.

* * * * *